Feb. 20, 1962  H. F. MYERS  3,021,968
LOAD EJECTOR MECHANISM FOR VEHICLE BODIES
Filed Dec. 1, 1958  4 Sheets-Sheet 1
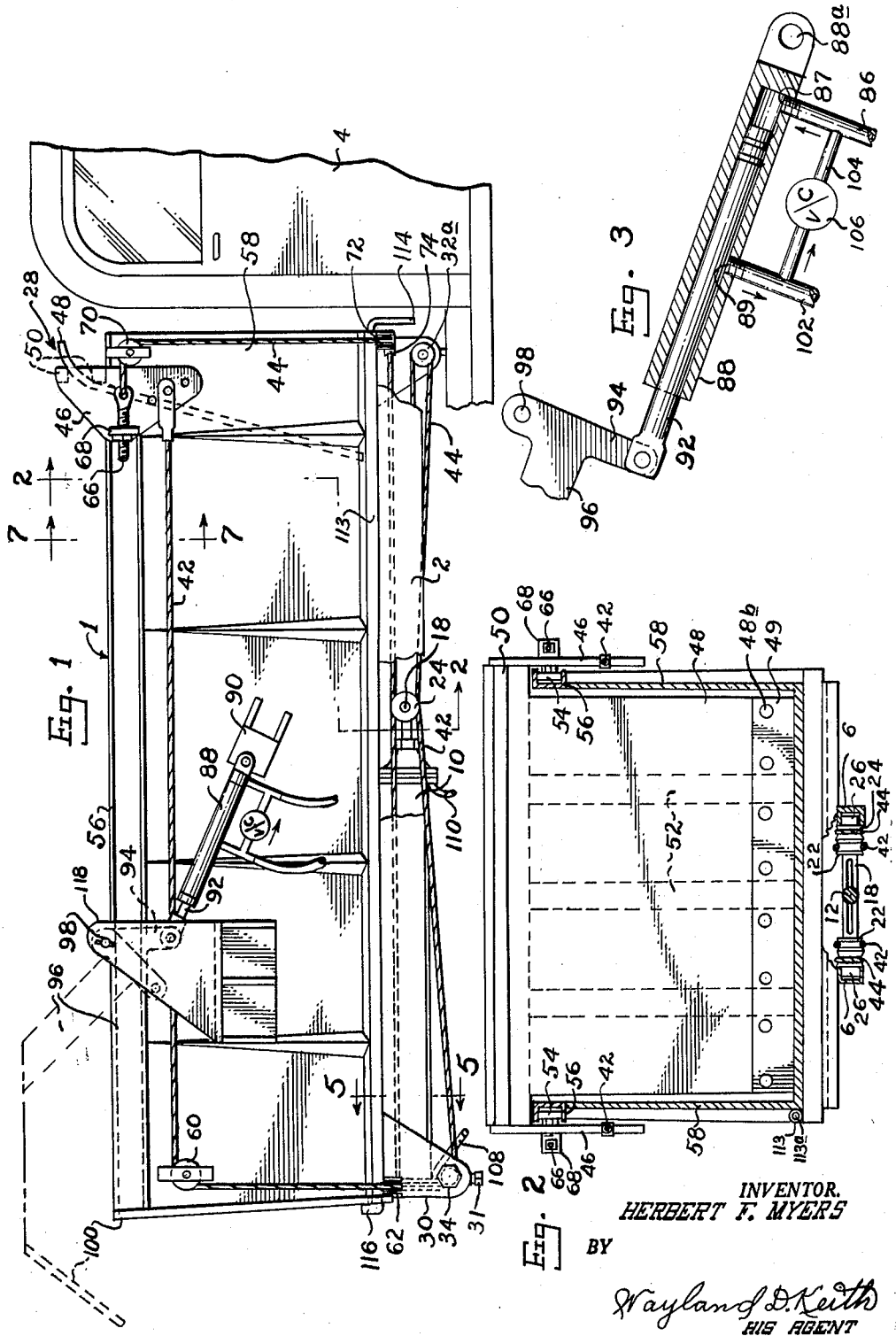
INVENTOR.
HERBERT F. MYERS
BY
Wayland D. Keith
HIS AGENT

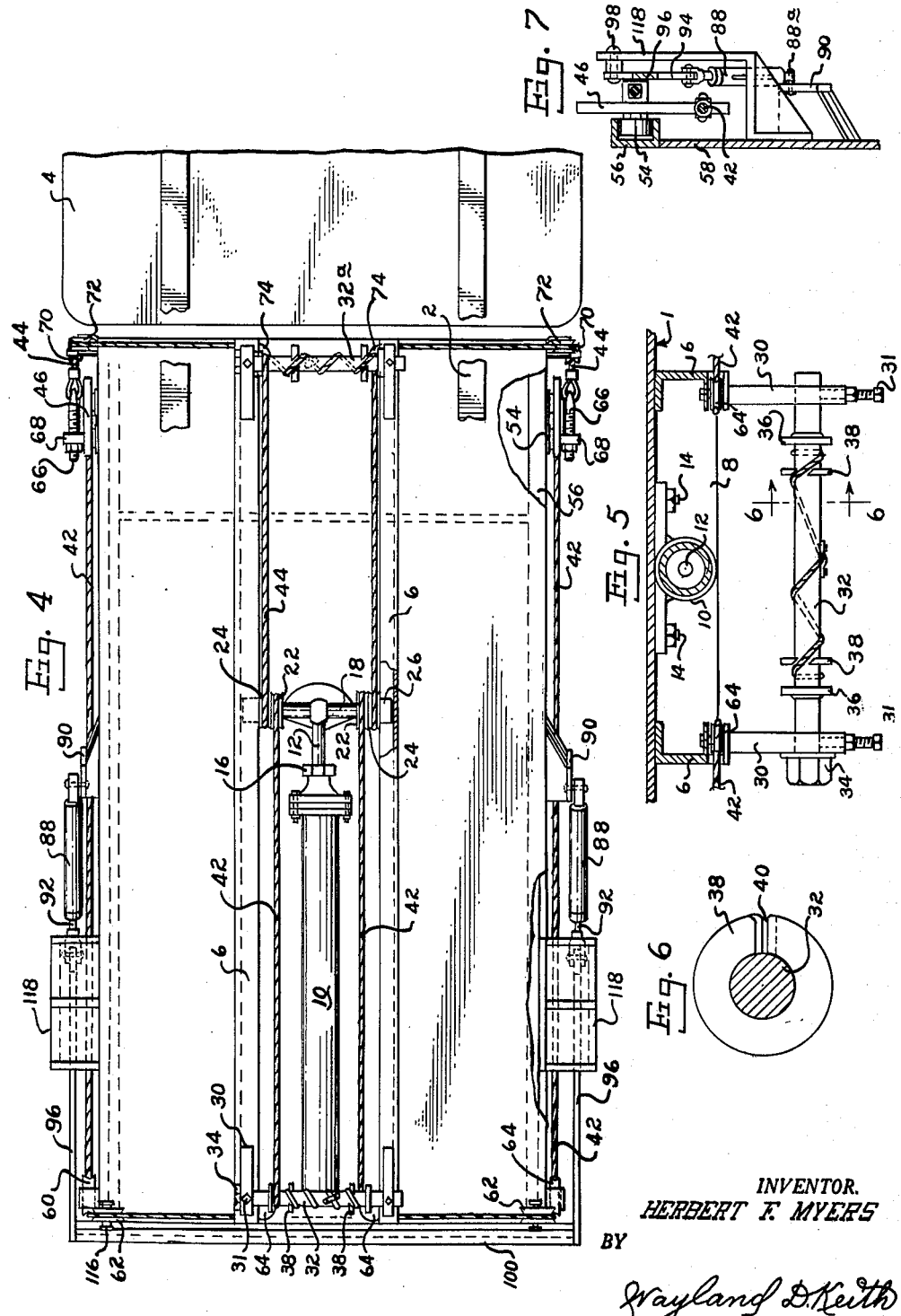

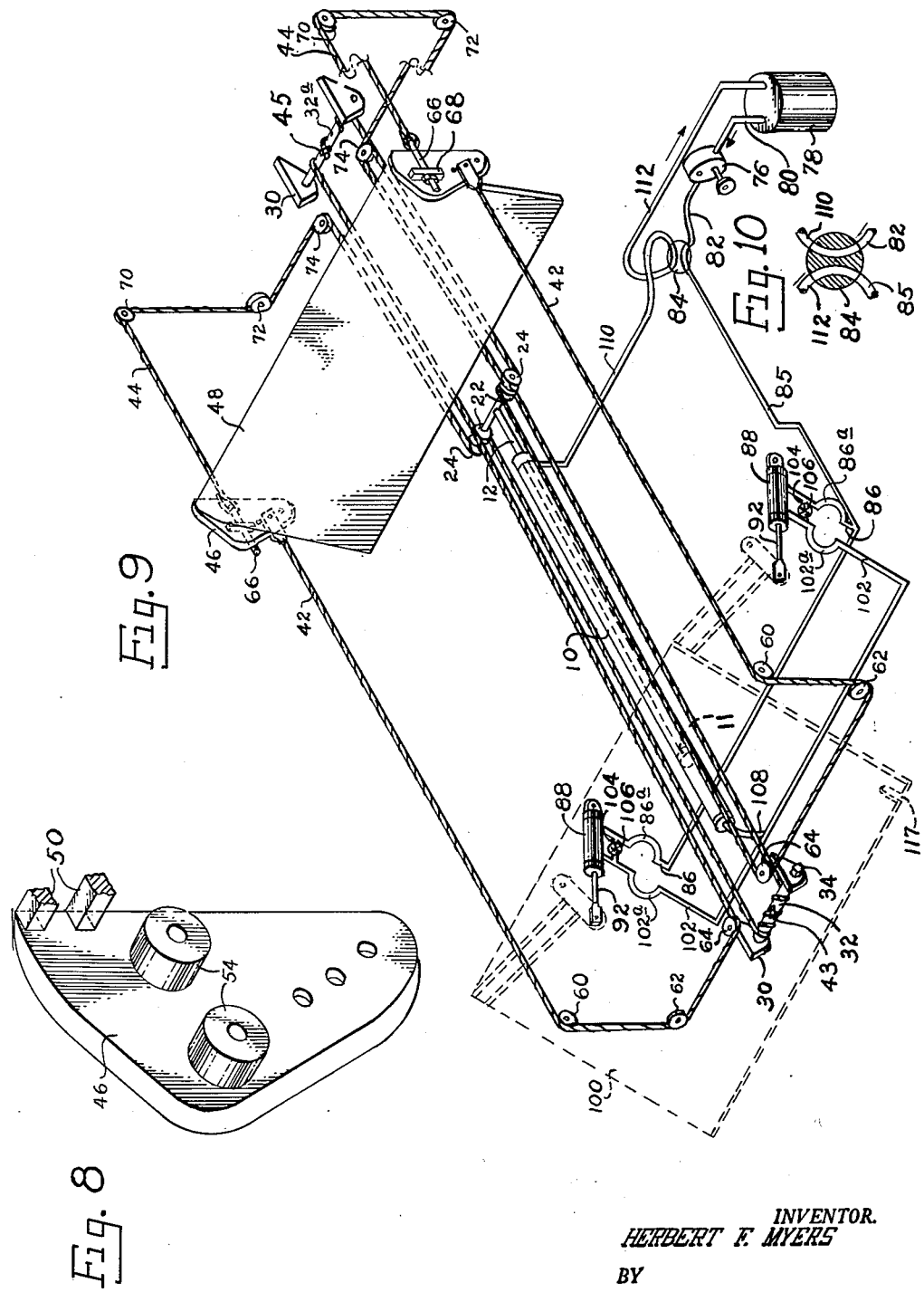

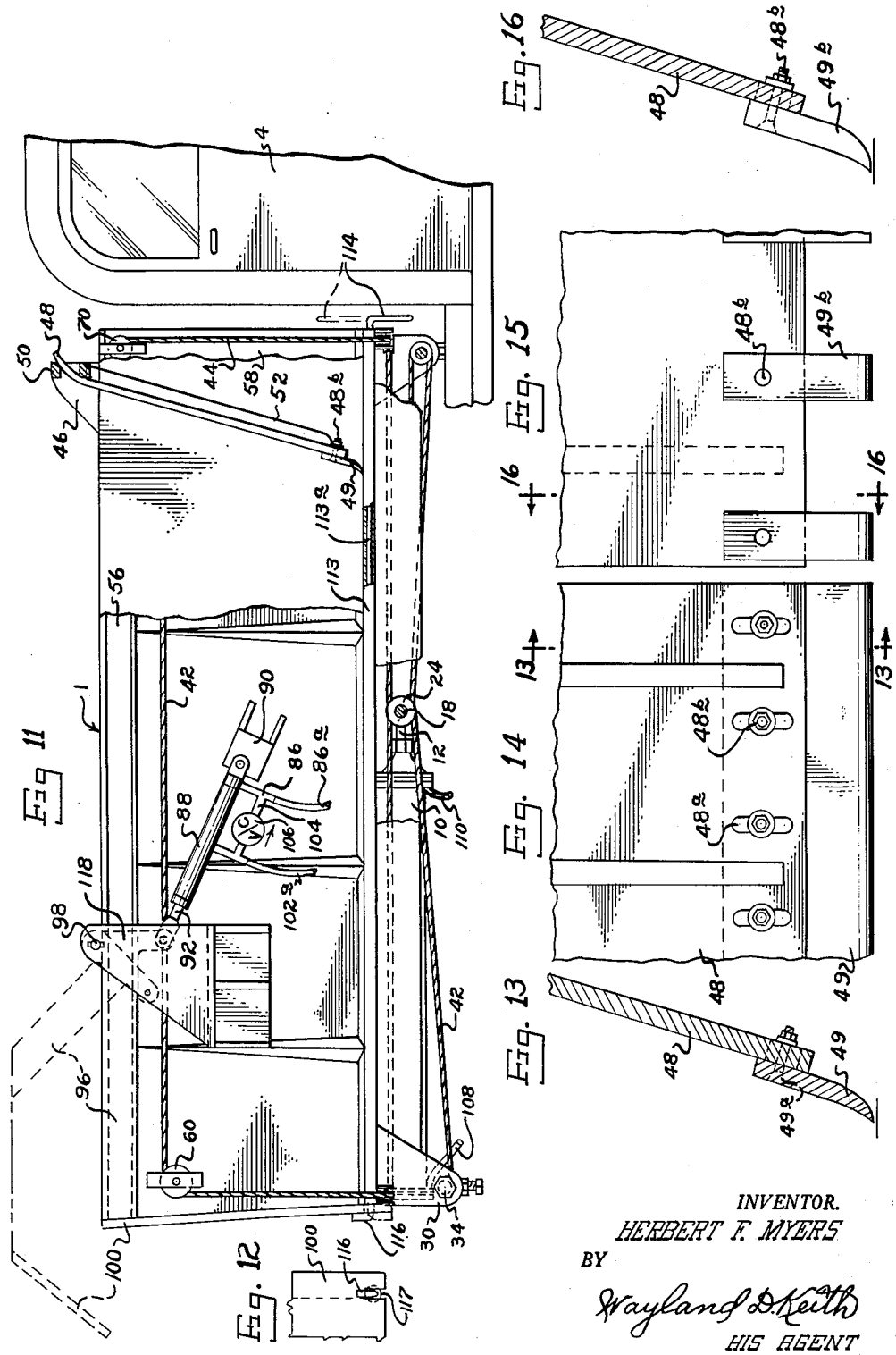

United States Patent Office 3,021,968
Patented Feb. 20, 1962

3,021,968
LOAD EJECTOR MECHANISM FOR VEHICLE BODIES
Herbert F. Myers, 327 NE. 40th St., Oklahoma City, Okla.
Filed Dec. 1, 1958, Ser. No. 777,502
5 Claims. (Cl. 214—82)

This invention relates to an improvement in vehicle bodies, and more particularly to vehicle bodies having a box-like bed with an ejector member which is movable longitudinally therein for ejecting a load therefrom.

Various vehicle bodies have been proposed heretofore, for hauling earth, granular material, grain and the like, but these, for the most part, utilized a tilting bed, which would pivot about a transverse pivot near the rear end of the bed, to raise the body to an angular position to cause the load to flow therefrom by gravity. In event the load was of such character as wet clay, or the like, the inclination of the body usually had to be so great that when the load moved downward, the entire load dumped at once. The use of a vehicle body which necessitated elevating the front end thereof, has limitations as to use, such as in tunnels, buildings and the like, where the roof height limited the raising of the bed. Furthermore, with the type of bed which must be elevated to be dumped, a uniform thickness of earth or the like could not be spread uniformly over a specified area.

In the present device, the body of the vehicle is so constructed that an entire load of earth, granular material, grain, or the like, can be discharged within a building, or the like and which building or other enclosure need be only of sufficient height to enable the truck body to be moved thereinto. Furthermore, the discharge apparatus, of the present device, is so constructed as to enable the ejector blade to be moved at a uniform rate, while the truck is in motion, thereby giving a uniform spreading of the material being dumped over the surface onto which it is being discharged.

An object of this invention is to provide an ejector mechanism for a vehicle body, wherein a load of granular material within the body, may be ejected uniformly without tilting the body of the vehicle.

Another object of the invention is to provide an ejector mechanism for a vehicle body, wherein a wall is positioned transversely of a vehicle body, and wherein provision is made for moving the wall back and forth longitudinally, by a cable and sheave arrangement positioned exteriorly of said vehicle body.

Still another object of the invention is to provide a hydraulic ejector mechanism for a vehicle body, which hydraulic mechanism will initially open the tail gate of the vehicle body prior to the movement of the ejector mechanism.

Still another object of the invention is to provide a hydraulic and cable actuated ejector mechanism wherein the unequal slackness of the cables may be readily adjusted, without removing the cables from the mechanism.

With these objects in mind and others which will become manifest as the description proceeds, reference is to be had to the accompanying drawings in which like reference characters designate parts in the several views thereof, in which:

FIG. 1 is a fragmentary elevational view of a vehicle, such as a truck or the like, showing a vehicle body thereon, with the present mechanism attached thereto;

FIG. 2 is a sectional view taken on the line 2—2 of FIG. 1, looking in the direction indicated by the arrows;

FIG. 3 is an enlarged, longitudinal, sectional view taken through the hydraulic tail gate actuating cylinder, and showing the valve arrangement thereof, and also showing a fragmentary portion of the bell-crank levers for raising the tail gate;

FIG. 4 is a bottom plan view of the vehicle body only, showing the hydraulic cylinder and the cable mechanism installed thereon and showing portions broken away to bring out the details of construction;

FIG. 5 is a fragmentary sectional view taken on the line 5—5 of FIG. 1, looking in the direction indicated by the arrows;

FIG. 6 is a fragmentary sectional view taken on the line 6—6 of FIG. 5, looking in the direction indicated by the arrows;

FIG. 7 is an enlarged, fragmentary, sectional view taken on the line 7—7 of FIG. 1, looking in the direction indicated by the arrows;

FIG. 8 is a perspective view of the ejector blade guide roller assembly, showing the ejector blade supporting member extending outward therefrom;

FIG. 9 is a perspective, diagrammatic view of the ejector blade and the ejector mechanism therefor, showing schematically, the arrangement of the hydraulic system and of the cable, and showing a four-way valve in position to direct the hydraulic fluid into the hydraulic cylinder to perform the ejecting action;

FIG. 10 is a diagrammatic view of the four-way valve in position to direct the hydraulic fluid into the opposite end of the cylinder, from that shown in FIG. 9;

FIG. 11 is a view similar to FIG. 1, but with a fragmentary portion of the vehicle body being broken away and parts being shown in section to show the details of construction of the removable and adjustable edge for the ejector blade;

FIG. 12 is a fragmentary view of the tail gate and the locking mechanism therefor;

FIG. 13 is an enlarged fragmentary sectional view taken on the line 13—13 of FIG. 14, looking in the direction indicated by the arrows;

FIG. 14 is a fragmentary rear elevational view of the ejector blade showing the ribbed elements thereon and showing means for adjusting the removable edge of the ejector blade;

FIG. 15 is a fragmentary front elevational view of the ejector blade showing toothed elements secured thereto; and FIG. 16 is a sectional view taken on the line 16—16 of FIG. 15, looking in the direction indicated by the arrows.

With more detailed reference to the drawing, the numeral 1 designates generally a vehicle body, which is of the type having a bottom and upright sides of a character which may be utilized for hauling granular material, such as earth, crushed stone, coal, grain, or other such material. The vehicle body 1 is mounted on frame 2 of a truck 4, in such manner that the particular ejecting mechanism may be mounted thereon.

The body 1 has a pair of longitudinal channels 6 mounted thereon, with the flanges thereof inturned, as will best be seen in FIGS. 2 and 5. A transverse member 8 is positioned across the rear end of channels 6, as is best seen in FIG. 5. A hydraulic cylinder 10 is positioned between the channels 6 so that the plunger 12 thereof will lie in a plane passing medially between the flanges of the longitudinally disposed channels. The cylinder 10 abuts with the transverse member 8 so that the reactionary thrust of the hydraulic cylinder will be borne by the transverse member 8. The hydraulic cylinder 10 is secured to the lower portion of the body 1 by means of bolts 14, as will best be seen in FIG. 5.

The plunger 12 of the hydraulic cylinder 10 extends outward through a packing gland 16 and is attached to a cross-head 18, which cross-head 18 has a transverse shaft 20 thereon. The transverse shaft 20 has sheaves 22 thereon in position to be on each side of plunger 12. Sheaves 24 are journaled on shaft 20 exterior of the sheaves 22. A guide roller 26 is positioned on each end of shaft 20, which guide rollers are of a size to fit within the inturned flanges of channels 6, as will best be seen in FIGS. 2, 4 and 5. The length of the stroke of the plunger 12 is one half the length of the stroke of the ejector blade assembly which is designated by the numeral 28.

A pair of downwardly extending support members 30 is mounted on the lower sides of channels 6, and which members are apertured to receive a shaft 32 therethrough. The shaft 32 is fitted in journaled relation therein and one end of the shaft has a head 34 thereon, to enable the turning thereof. A pair of flanges 36 are fitted on shaft 32 intermediate downwardly extending support members 30, one in close proximity to each downwardly extending support member 30, so as to maintain a cable therebetween. A pair of radially slotted divider discs 38 is fitted on shaft 32 so a cable may be passed around the shaft in spiral convolutions and out through radial slots 40, of the respective divider discs 38, to a point exterior of the divider discs 38.

The device as shown herein utilizes two cable adjusting devices, as shown in FIGS. 4 and 5, one at each end of the body. The purpose of which adjusting devices will be more fully brought out hereinafter.

The cable system, which moves the ejector blade assembly 28 rearward, is designated generally at 42, and the cable mechanism which moves the ejector blade assembly forward is designated generally at 44. The cable 42 is anchored, as indicated at 43, to the shaft 32, and the cable 44 is anchored at 45 to the shaft 32, the purpose of which will be brought out more in detail hereinafter.

The ejector blade assembly 28 has a mounting plate 46 on each end of the blade 48, which plates 46 are secured to the blade 48 as by welding, as will best be seen in FIGS. 1 and 2. A transverse support beam 50 extends between plates 46 and is secured to the respective plates, as by welding or the like. Upright bars 52 are secured to the lower side of transverse bar 50 and to the rear side of blade 48, so as to brace the blade 48.

The lower edge of the blade 48 has slotted openings 48a formed therein for passing bolts 48b therethrough and through removable edge element 49, which has countersunk holes 49a therein, to secure the edge element 49 to the ejector blade 48. The edge element 49 curves forwardly and is pointed, to urge granular material upward. For heavy granular material, teeth 49b are provided, which may be secured to ejector blade 48 by bolts 48b, so as to enable the ejecting of heavy, lump material, such as coal, rock, or the like. It is preferable to have the lower edge of edge element 49 or the toothed elements 49b so adjusted as to slightly clear the upper surface of the floor of the vehicle body 1.

Each of the plates 46 has pairs of horizontally arranged rollers 54 on the inner face thereof, in side by side relation, and which rollers are of a size to complementally engage with channels 56, which are secured along the upper portion of upright sides 58 of vehicle body 1.

The vehicle body 1 has a pair of sheave rollers 60 mounted thereon near each end thereof, one on the exterior of each of the upright sides 58, for passing cable 42 thereover. A second pair of sheave rollers 62, one on each side of vehicle body 1, is mounted, one near the lower portion of each of the upright sides 58, so that one face of each of the respective sheaves 62 will be tangential with a face of the respective sheave rollers 60, but with the axis thereof positioned at a right angle thereto, so that the cables 42 will pass thereover in rolling relation with respect to the respective sheaves.

A third pair of sheaves 64 is mounted on the under side of the bottom of body 1, so the axis of these sheaves will be at a right angle to the axis of sheaves 60, 62, which sheaves 64 have their respective faces arranged to be tangential with respect to the faces of sheaves 62. The sheaves 64 are spaced apart so one will be on each side of the fluid cylinder 10. The fluid cylinder 10 has a plunger 12 extending outward therefrom, and on which plunger 12 the sheaves 22 are positioned so a face of each sheave 22 will be in aligned relation to a face of a sheave 64, but with the axis of sheaves 22 being at a right angle to the axis of sheaves 64.

The cable 42 is anchored at each end thereof to the respective plates 46 and extends rearward over sheaves 60, sheaves 62, sheaves 64, and thence around sheaves 22, with the central portion of the cable extending rearward to a cable adjusting roller 32, where the cable 42 is spiraled therearound in such manner that the cable 42 will pass through a notch in the respective plates and be anchored, as indicated at 43, with respect to the cable adjusting roller 32. The cable adjusting roller 32 is adapted to be rolled in one direction or the other, by the use of a wrench on the hexed portion 34 of the adjusting roller 32. Once the reaches of cable 42 are equalized, set screws 31 may be tightened to maintain the roller 32 against both rotary and longitudinal movement.

Cables 44 are attached to threaded members 66, which threaded members pass through apertured eyes 68 on the outer side of each of the plates 46. It is preferable to have the cables 44 attached to plates 46 in such manner that they will extend horizontally forward and lie in a horizontal plane passing medially through channels 56.

A pair of sheaves 70 is mounted on vehicle body 1, so one of the sheaves will be on the exterior, near the upper portion, of each upright side member 58 near the forward ends thereof, with the axis of said sheaves being coaxial. A second pair of sheaves 72 is mounted on the forward end of the vehicle body 1, one on each side thereof near the lower edge of each upright side 58, so the axes of the respective sheaves 72 will be at right angles to the axes of the respective sheaves 70, and with a face of each of the sheaves 72 being approximately tangential with the respective faces of the sheaves 70. A third pair of sheaves 74 is mounted on the bottom portion of the vehicle body 1, with the axes thereof being at right angles to the axes of the sheaves 70 and 72. A fourth pair of sheaves 24 is mounted on shaft 20, so that one of the faces of each of the sheaves will be substantially in alignment with the respective sheaves 74.

A second cable adjusting roller is shown at 32a, which roller 32a is identical in construction with the cable adjusting roller 32, as shown in FIG. 5.

The cable 44 passes forward over sheaves 70, thence downward beneath sheaves 72, inward over sheaves 74, which sheaves 74 are spaced apart, thence rearward around sheaves 24, thence forward, with the medial portion of the cable 44 being wound in a spiral around roller 32a, so that one reach of the cable will pass above the roller 32a and the other reach thereof will pass below the roller 32a. The roller 32a is provided with a central cable anchor 45, as will best be seen in FIG. 4 and with dividers 38, as will be seen in FIGS. 5 and 6.

The fluid cylinder 10 is bolted, or otherwise secured to the under side of the bottom of vehicle body 1, medially thereof so that the plunger 12 is positioned within a longitudinal medial plane passing between the inturned flanges of channels 6 and with the cables 42 and 44 surrounding sheaves 22 and 24, as set out above, and with nuts on screwthreaded members 66 tightened to abut with the outturned lugs 68, and with the cable roller adjusting members 32 and 32a being adjusted so the reaches of the respective cables 42 and 44 are of the same tautness and of the same length with respect to the center cable anchor members 43 and 45 of the respective roller members 32 and 32a, the transverse blade 48 is in position to be moved back and forth.

Fluid is supplied to cylinder 10 by a pump 76, which may be a hydraulic pump, or the like, which withdraws hydraulic fluid from a sump 78 through pipe 80 and discharges it out through pipe 82 into four-way valve 84. When the valve 84 is in the position as shown in FIG. 9, the fluid will be directed into pipe 85, which in turn connects with the respective pipes 86 leading into a cylinder 88 on each exterior side of the vehicle body 1. Each hydraulic cylinder 88 is pivotally mounted at one end to a mounting bracket 90. Each cylinder 88 has a plunger 92 extending outward therefrom to connect with an arm 94 on the respective sides of the vehicle body, which arms 94 form a portion of the respective bell crank levers 96, one of which bell crank levers 96 connects to each side of tail gate 100, so the tail gate extends transversely across the rear end of the vehicle body 1. The operation of the tail gate will be explained more in detail hereinafter.

Each cylinder 88 has an inlet port 87, one of which inlet ports is connected to each of the pipes 86. Each of the cylinders 88 has an outlet port 89, one of which is connected to each of the pipes 102. By-pass conduits 104, each having a check valve 106 therein, extends between the respective pipes 86 and 102, which by-pass conduits will restrain the flow of hydraulic fluid in one direction, but will permit free flow thereof in the direction indicated by the arrows in FIG. 3, when the flow of fluid in the pipes 86 and 102 is reversed. Each plunger 92 is of such length as to move from the position as shown in full outline, in FIG. 3, to that shown in dashed outline therein, whereupon, fluid entering the respective cylinders 88, through the respective inlet ports 87 will be directed therethrough and out through the respective outlet ports 89 into the respective pipes 102. Thus the pressure will maintain the plungers in this position so long as the fluid pressure is maintained on pipes 86.

Flexible hose 86a and 102a connect within the respective pipes 86 and 102, adjacent the respective cylinders 88, so as to enable the cylinders 88 to pivot about the respective pivot pins 88a, to enable the proper movement of the respective cylinders 88 to actuate the tail gate 100.

As the hydraulic fluid flows into the respective pipes 102 from the respective cylinders 88, the fluid will flow out through the respective pipes 108 into the rear end of cylinder 10, which will force the plunger 12 forward, which in turn, will cause the hydraulic fluid in the cylinder 10, on the opposite side of piston 11, to be expelled through pipe 110 and through four-way valve 84 into discharge pipe 112 to be returned to sump 78. This will move the plunger 12 and sheaves 22 and 24 forward to move the transverse blade 48 rearward, as will be more fully explained hereinafter.

With the four-way valve 84 in the position as shown in FIG. 10, the hydraulic pump 76 will be directed from sump 78 up through pipe 80 and be discharged from pump 76 into pipe 82, thence into pipe 110 leading to the front end of cylinder 10, and, upon pressure being applied to cylinder 10, the piston 11 will move rearward, which will cause the fluid from the rear end of the cylinder to be discharged through pipe 108 into pipe 102, and since the pressure has been relieved from pipes 86, the tail gate 100 will have moved downward until plunger 92 covers port 86, which prevents the return flow of fluid therethrough. However, the fluid is by-passed through by-pass conduit 104 and through check valve 106 into pipes 86, returning through pipe 85 to and through four-way valve 84 into pipe 112 leading to sump 78. This will permit the tail gate 100 to close into abutting relation with the ends of upright sides 58, whereupon, by moving handle 114 through 90 degrees, a latch member 116 will be moved behind the tail gate 100 to retain the tail gate in closed position, during normal transit of the vehicle. It is to be pointed out that, due to the unequal balance of tail gate 100 and arms 96, the tail gate will fall into place by gravity, when fluid pressure is released from cylinders 88, and since the lower end of the gate is further forward than the upper portion thereof, the tail gate will have a natural tendency to remain in place when the load within the body is pressing thereagainst.

A tubular member 113 extends along one side of the vehicle body 1 and serves to house a shaft 113a, which shaft has a handle 114 at the forward end of body 1 in position to be within easy reach of the driver of the vehicle. The opposite end of shaft 113a has a latch member 116 thereon, which, when in the position as indicated in dashed outline in FIG. 11, will pass through slot 117 in the tail gate 100, however, when the tail gate is closed, as shown in full outline in FIG. 11, the handle 114 may be moved from the position as indicated in dashed outline to that indicated in full outline in FIG. 11, and the latch 116 will move into the position as shown in full outline in FIGS. 11 and 12, which will retain the tail gate against outward movement.

*Operation*

The vehicle body 1 is ready to load when the transverse ejector blade 48 is in position, as shown in FIG. 1. The transverse ejector blade 48 is inclined upwardly and forwardly so, when the blade is moved against the material of the load, such as earth or other granular material, a plowing or lifting action is accorded, which relieves some of the frictional contact thereof from the bottom of the body. The plates 46 are so arranged as to extend downward a substantial distance below the top of the body and are apertured along the lower sides thereof so cables may be connected thereto so the pulling action may be exerted a substantial distance below the top of upright sides 58, so that the pull thereon will be somewhat equalized.

With the tail gate 100 closed, as shown in full outline in FIG. 1, the vehicle body is ready to load. When the loading is completed, the material of the load may be transported to the desired point of discharge, where the entire load may be discharged at once, or the load may be gradually pushed to the rear of the vehicle body and be discharged therefrom in regulated, predetermined amounts.

When it is desired to discharge the material of the load from the vehicle body 1, the latch member 116 is moved, by means of handle 114, until the latch is free of engagement with tail gate 100. The hydraulic pump 76 may then be connected with a prime mover, by means of a power take-off or other mechanical connection, so as to withdraw hydraulic fluid from the sump or reservoir 78 through pipe 80 and discharge the hydraulic fluid through pipe or conduit 82, through four-way valve 84, thence out through conduit 85 into pipe 86. A length of flexible hose 86a is provided within the length of each of the pipes 86 in close proximity to hydraulic cylinders 88, to enable the respective cylinders 88 to pivot about the respective pivots 88a, as the plungers 92 move outward. The plungers 92 move outward to open the respective outlet ports 89 of the cylinders 88, so as to direct hydraulic fluid therethrough, into pipes 102 and through flexible hose connections 102a and thence into hydraulic cylinder 10 to move plunger 12 and cross-head 18 forward, so that the guide rollers 26 will roll within the channels 6. As the plunger 12 moves outward, the cable 42, which is anchored to each of the side plates 46, will be drawn rearward over the pairs of sheave pulleys 60 and 62, and thence around pulleys 22, and with the cable anchored as indicated at 43, the transverse ejector blade 48 will be drawn rearward to eject the load from the rear end of vehicle body 1. As the cable 42 is drawn rearward, a cable 44, which is attached to each side of transverse blade 48, is also drawn rearward. The sheave arrangement, comprising pairs of sheaves 70, 72, 74 and 24, is so arranged as to direct cable 44 around the various sheaves and over sheaves 24 which are mounted on shaft 20, is substantially the same as the arrangement of sheaves aforementioned. However, the cables 44 are preferably in alignment with the axes of the pairs of rollers 54, to enable the transverse blade 48 to be readily withdrawn from the rear of the body portion of the vehicle to the forward end thereof.

Should the cables 42 become loosened more on one side of the vehicle body than on the other, this looseness can readily be compensated for by turning roller 32 in one direction or the other, until both reaches of the cable are of equal tautness. However, in doing this, the reaches of the cable 44 may become unequal in tightness, therefore, the cable adjusting roller 32a, around which the cable 44 is coiled, may be rotated until the respective reaches of the cable are practically of equal tautness. However, if the tautness of the reaches is unequal, or if the reaches are too loose, further adjustment may be had by tightening a nut on the respective screw threaded members 66, which members pass through the respective apertured lugs 68, thereby the individual reaches of the cable may be adjusted to the desired tautness and length.

It is to be pointed out that, upon initial pressure being applied to the cylinders 88, the tail gate 100 will be moved into the position as shown in dashed outline in FIGS. 1 and 9, which is the raised or open position, and will be held in this position as long as pressure is held on pipes 86. As the transverse ejector blade 48 moves rearward, the plates 46 will pass between brackets 118 and the upstanding sides 58, as will best be seen in FIG. 7, which will enable the plates 46 to extend downward to a point intermediate the height of upright sides 58, to enable an equalized pull to be applied to transverse ejector blade 49.

The brackets 90 pivotally mount each of the hydraulic cylinders 88 in position to be in alignment with the arms 96 to enable the lifting of the tail gate 100.

Upon moving the hydraulic valve 84 from the position as shown in FIG. 9, to the position shown in FIG. 10, hydraulic fluid is directed from the sump or reservoir 78, up through pipe 80 into pump 76, thence out through pipe 82 into pipe 110, which will move piston 11 rearward in cylinder 10 to cause the hydraulic fluid in the rear end of the cylinder 10 to exhaust out through pipe 108 into pipes 102, thence through pipe 104 and check valve 106 into pipes 86, 85 and thence through four-way valve 84 into pipe 112 leading to the sump or reservoir 78. When the ejector blade 48 has moved into the initial starting position, as shown in FIG. 1, the power which drives the pump 76 may be disengaged until such time as the cycle is to be repeated.

While the invention has been illustrated and described in some detail in one embodiment thereof, it is to be understood that changes may be made in the minor details of construction without departing from the spirit of the invention or the scope of the appended claims.

Having thus clearly shown and described the invention, what is claimed as new and desired to be secured by Letters Patent is:

1. An unloading device for a vehicle body, which body has a bottom, upstanding sides, and a movable tail gate, said upstanding sides being fixedly secured to said bottom throughout the length thereof; which unloading device comprises a movable transverse wall positioned between said upstanding sides, roller guide channels mounted along the top portion of each said upstanding sides with the respective flanges thereof facing inwardly, a bracket secured on each end of said transverse wall near the top thereof and extending downwardly a spaced distance exteriorly of the top of the respective sides, each of said brackets having a cable anchor thereon exterior of said body, a pair of channel members mounted on the lower side of said vehicle body longitudinally thereof and having the flanges thereof facing inwardly, which channels are spaced apart and parallel, means supplying hydraulic pressure, a first hydraulic cylinder fixedly secured to the lower side of said vehicle body medially of said longitudinal channel members which are mounted on the lower side of said vehicle body, a piston rod mounted in said hydraulic cylinder and extending outwardly from an end thereof, a shaft mounted on the outer end of said piston rod transversely thereof, sheave pulleys journaled on said transverse shaft on said piston rod, at least one on each side thereof, a roller journaled on each end of said transverse shaft on said piston rod and fitted in complementary rolling relation within said respective longitudinal, parallel channel members mounted on the lower side of said vehicle body, further pulleys mounted on the sides of said vehicle body at opposite ends thereof and having at least a portion of a sheave of each pair of adjacent pulleys positioned to be tangent, cables reeved over said respective sheave pulleys on said transverse shaft and over the sheaves of said pulleys mounted on said vehicle body so as to direct cables from the sheaves of said pulleys mounted on said body into aligned relation with said cable anchors on said respective brackets, the respective ends of said cables being connected to said anchors on said respective brackets, further anchors on said body for anchoring an intermediate portion of each of said cables to said body, hydraulically actuated means connected to said movable tail gate, a hydraulic conduit system connecting said means supplying hydraulic pressure with said hydraulic actuating means connected to said movable tail gate and to said hydraulic cylinder to supply said hydraulic pressure to sequentially actuate said means for actuating said movable tail gate and said hydraulic cylinder.

2. An unloading device as defined in claim 1, wherein each said further anchors comprises an elongated roller member mounted transversely on said vehicle body near each end thereof for rotation about their respective axes, means securing said cable to said respective roller members so when said cable is coiled around the respective roller members the respective reaches thereof will pass off said respective roller members in approximately parallel relation, means for rotating said roller members and means for selectively securing said roller members in fixed relation with respect to said body.

3. In a device for opening the tail gate of a vehicle body, a first hydraulic cylinder mounted on said body in position to unload the contents of said body, a plunger mounted within said first hydraulic cylinder, a hydraulic pump system for operating the plunger of said first hydraulic cylinder, at least one second hydraulic cylinder pivotally mounted on said body and being pivotally connected to said tail gate for opening said tail gate, a hydraulic fluid supply conduit leading from said hydraulic pump to the inlet port of said second hydraulic cylinder and being connected therewith for applying hydraulic pressure to the plunger thereof to move said plunger outwardly, said second hydraulic cylinder having an outlet port formed therein within the length of travel of the plunger thereof, which port is initially sealed by said plunger with respect to said inlet opening, a conduit connected with said outlet port in said second hydraulic cylinder and to said first hydraulic cylinder so as to direct hydraulic fluid from said second hydraulic cylinder into said first hydraulic cylinder after said plunger in said second cylinder has moved a predetermined distance, a by-pass conduit, a check valve within said by-pass conduit, which conduit is connected with said outlet conduit and with said inlet conduit so as to by-pass said second hydraulic cylinder, and valve means within said inlet conduit to control the flow of hydraulic fluid in said hydraulic fluid inlet conduits to close said tail gate.

4. A device for opening the tail gate of a vehicle body as defined in claim 3, wherein one said second hydraulic cylinder is pivotally mounted on each side of said body, and wherein the plungers of the respective second hydraulic cylinders connect to the respective ends of said tail gate, and wherein a conduit connects the respective outlet ports of said second hydraulic cylinders and a conduit connects the respective inlet ports of said second hydraulic cylinders.

5. An unloading device for a vehicle body, which body has a bottom and upstanding sides, which respective sides are joined to said bottom throughout the length thereof;

which device comprises a movable transverse wall positioned between said upstanding sides, a movable tail gate, a source supplying hydraulic fluid under pressure, a first hydraulic cylinder mounted on said body longitudinally thereof, at least one further hydraulic cylinder, a plunger slidably mounted in said further hydraulic cylinder, said further hydraulic cylinder being mounted on said body and being operatively connected to said movable tail gate to move said tail gate in one direction, a conduit connected to said source supplying hydraulic fluid under pressure and to said further hydraulic cylinder, a control valve within said conduit intermediate said source supplying hydraulic fluid under pressure and said further hydraulic cylinder for directing hydraulic fluid under pressure to said further hydraulic cylinder, and another conduit leading from a side of said further hydraulic cylinder intermediate the length thereof to said first hydraulic cylinder for directing hydraulic fluid therefrom into said first mentioned hydraulic cylinder sequentially upon a predetermined length of travel of said plunger of said further hydraulic cylinder, a by-pass conduit, which by-pass conduit extends between said conduit leading into said further hydraulic cylinder and the conduit leading from said further hydraulic cylinder, a one-way check valve positioned within said by-pass conduit for directing fluid from said conduit leading to said further hydraulic cylinder into said conduit leading to said further hydraulic cylinder upon release of pressure from said first mentioned conduit to permit movement of said movable tail gate in an opposite direction.

References Cited in the file of this patent

UNITED STATES PATENTS

| | | |
|---|---|---|
| 2,318,886 | Paiment | May 11, 1943 |
| 2,530,350 | Ehlert | Nov. 14, 1950 |
| 2,644,309 | Detrez | July 7, 1953 |
| 2,726,776 | Myers | Dec. 13, 1955 |
| 2,729,346 | German | Jan. 3, 1956 |
| 2,751,096 | Darkenwald | June 19, 1956 |
| 2,912,128 | Kamin | Nov. 10, 1959 |